March 29, 1966 H. C. SWIFT 3,243,016
COMBINED HYDRAULIC AND MECHANICAL BRAKE
Filed June 25, 1964 3 Sheets-Sheet 1

INVENTOR.
Harvey C. Swift
BY
Carness, Dickey & Pierce
ATTORNEYS.

March 29, 1966  H. C. SWIFT  3,243,016
COMBINED HYDRAULIC AND MECHANICAL BRAKE
Filed June 25, 1964  3 Sheets-Sheet 2
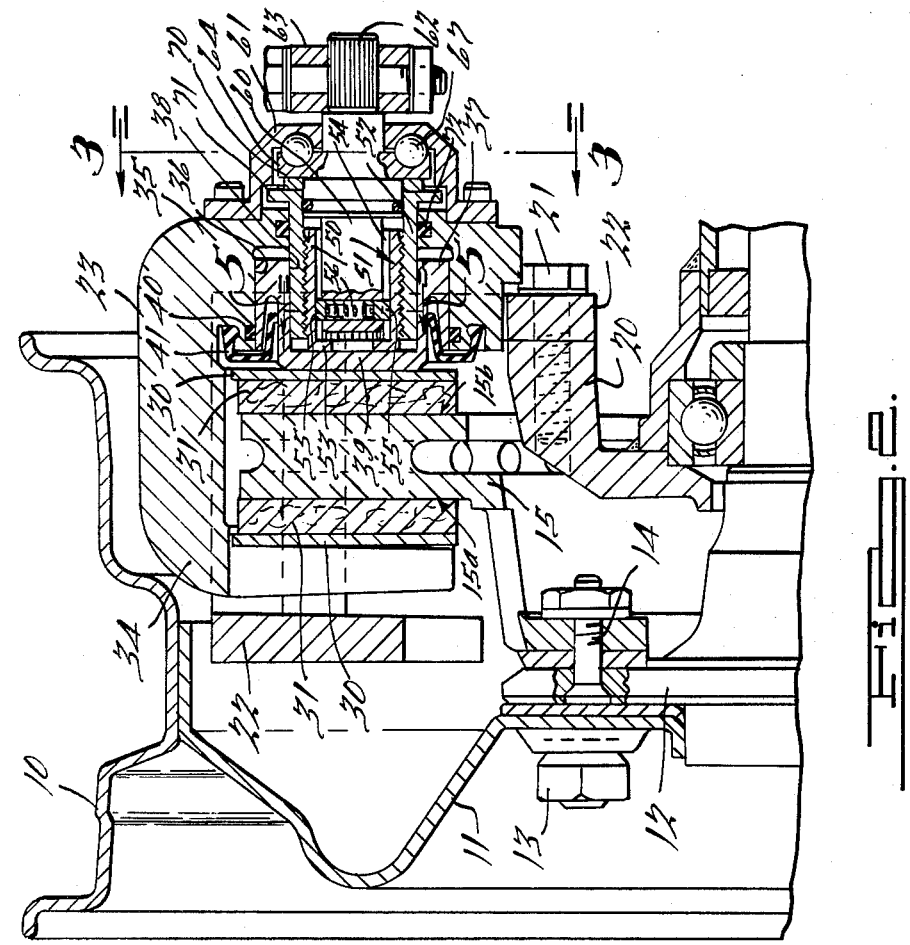
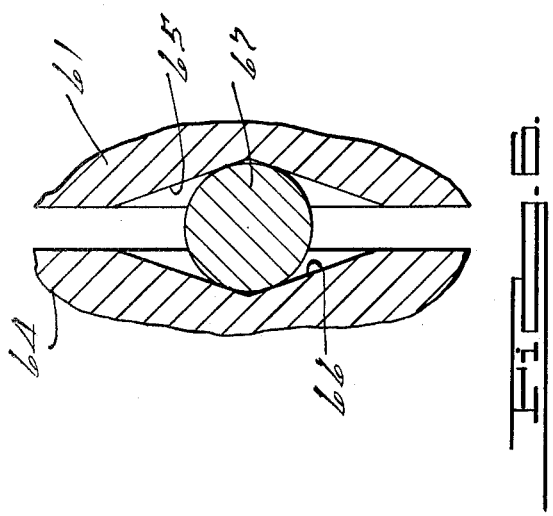
INVENTOR.
Harvey C. Swift,
BY
Harness, Dickey & Pierce
ATTORNEYS.

March 29, 1966  H. C. SWIFT  3,243,016
COMBINED HYDRAULIC AND MECHANICAL BRAKE
Filed June 25, 1964  3 Sheets-Sheet 3
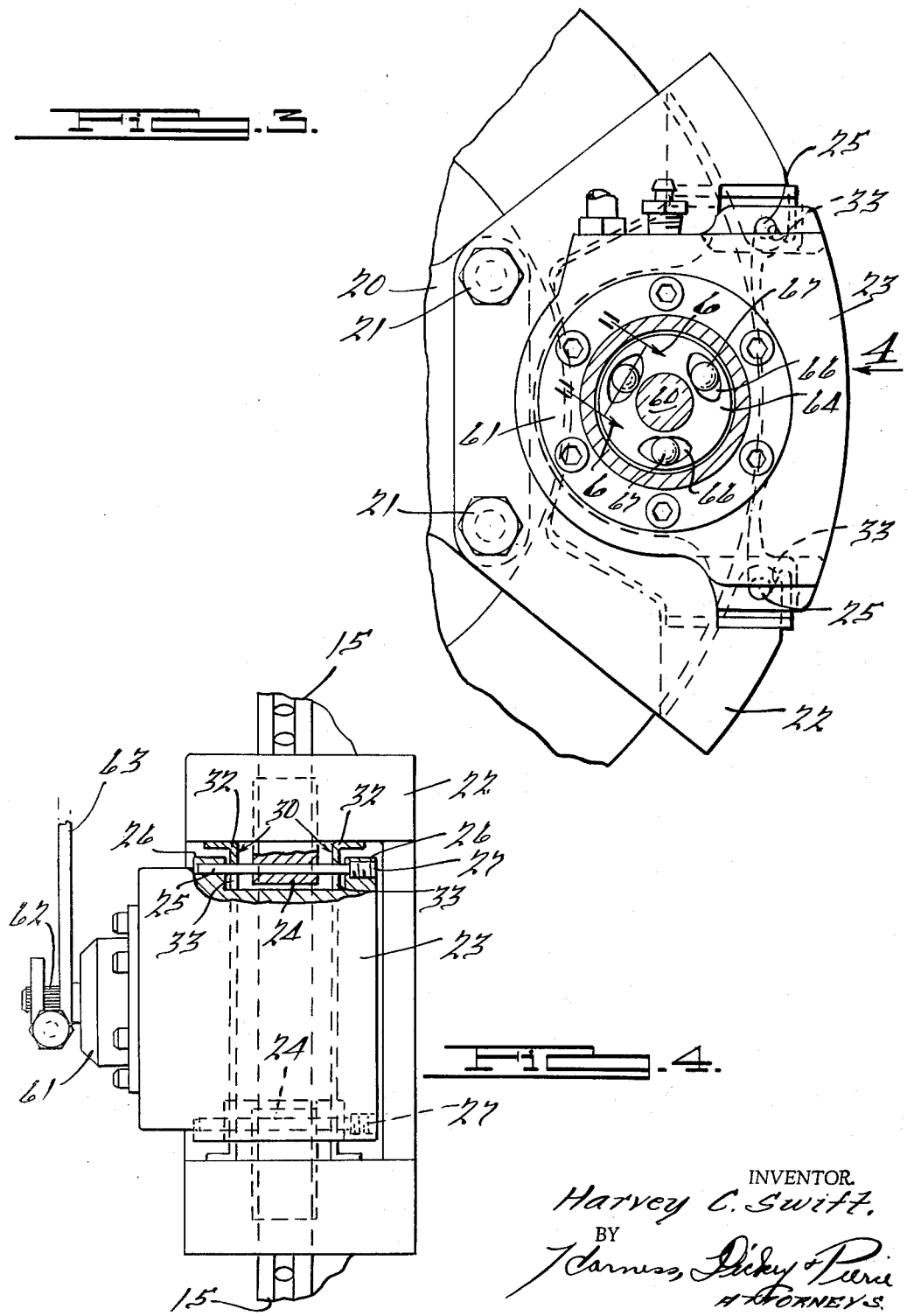
INVENTOR.
Harvey C. Swift.

United States Patent Office 3,243,016
Patented Mar. 29, 1966

3,243,016
COMBINED HYDRAULIC AND MECHANICAL BRAKE
Harvey C. Swift, Birmingham, Mich., assignor to Kelsey-Hayes Company, Romulus, Mich., a corporation of Delaware
Filed June 25, 1964, Ser. No. 377,863
4 Claims. (Cl. 188—73)

This invention relates to brakes of the disk type and, more particularly, to a combined hydraulic and mechanical brake wherein the mechanical brake is usually employed as a parking or emergency brake.

When hydraulically operated disk brakes are employed, difficulties have been encountered in associating the emergency or parking brake therewith. Such difficulties have been partially solved by employing disk brakes for the front wheels and drum and shoe type brakes for the rear wheels because of the relative ease with which the parking brake can be integrated with the drum and shoe type brake. Such an arrangement, however, presented new problems. The combination of disk type and drum type brakes produced a mismatched set of brakes because the operating characteristics of disk and drum type brakes are different, particularly in the higher ranges. Also with a given pedal pressure the disk brakes were applied first due to the inertia of the brake shoes in the drum and shoe type brakes. This necessitated the use of reducing valves or other types of control devices in the hydraulic system which complicated it and added to the cost thereof.

It is, therefore, a primary object of this invention to provide a hydraulically operated disk brake having a mechanically operated parking or emergency brake combined therewith in such a manner that each brake actuating mechanism may be operated independently of the other and wherein the combined brakes and actuating means therefor are consolidated and assembled into a unit which may be economically manufactured, quickly and easily assembled and installed, and in which maintenance costs are reduced to a minimum.

The above and other objects and advantages of the invention are attained by a construction comprising a torque member secured to a stationary part of the axle housing and slidably supporting a floating head or yoke for movement in the direction of the axis of the wheel. This floating head or yoke carries a piston for actuating one brake shoe and transfers the reactions of the piston to the other brake shoe. The brake shoes engage a rotor or brake disk connected to a rotating part of the wheel axle.

The piston is hollow and located therein is a two-part extensible sleeve-like member adapted to engage the piston to move it toward brake applying position and to adjust the piston to take up wear on the brake linings. The sleeve-like member is mechanically actuated to move it and the piston into brake applying position and the two parts of the sleeve-like member are relatively rotated to increase the length of the extensible sleeve-like member to adjust the idle position of the piston to compensate for wear on the brake shoe linings.

The construction and arrangement of the parts is such that the mechanical brake actuating and adjusting means may be effectively consolidated with the brake actuating piston and assembled therewith as a compact unit.

The various objects and advantages, and the novel details of construction of one commercially practical embodiment of the invention, will become more apparent as this description proceeds, especially when considered in connection with the accompanying drawings, in which:

FIGURE 2 is an enlarged fragmentary sectional view taken substantially on the plane indicated by line 2—2 in FIGURE 1;

FIGURE 3 is a fragmentary sectional elevational view taken substantially on line 3—3 in FIGURE 2;

FIGURE 4 is an elevational view looking in the direction of the arrow 4 in FIGURE 3, certain parts being broken away and in section;

FIGURE 6 is a detailed view taken on line 6—6 in FIGURE 3.

Figure 1:
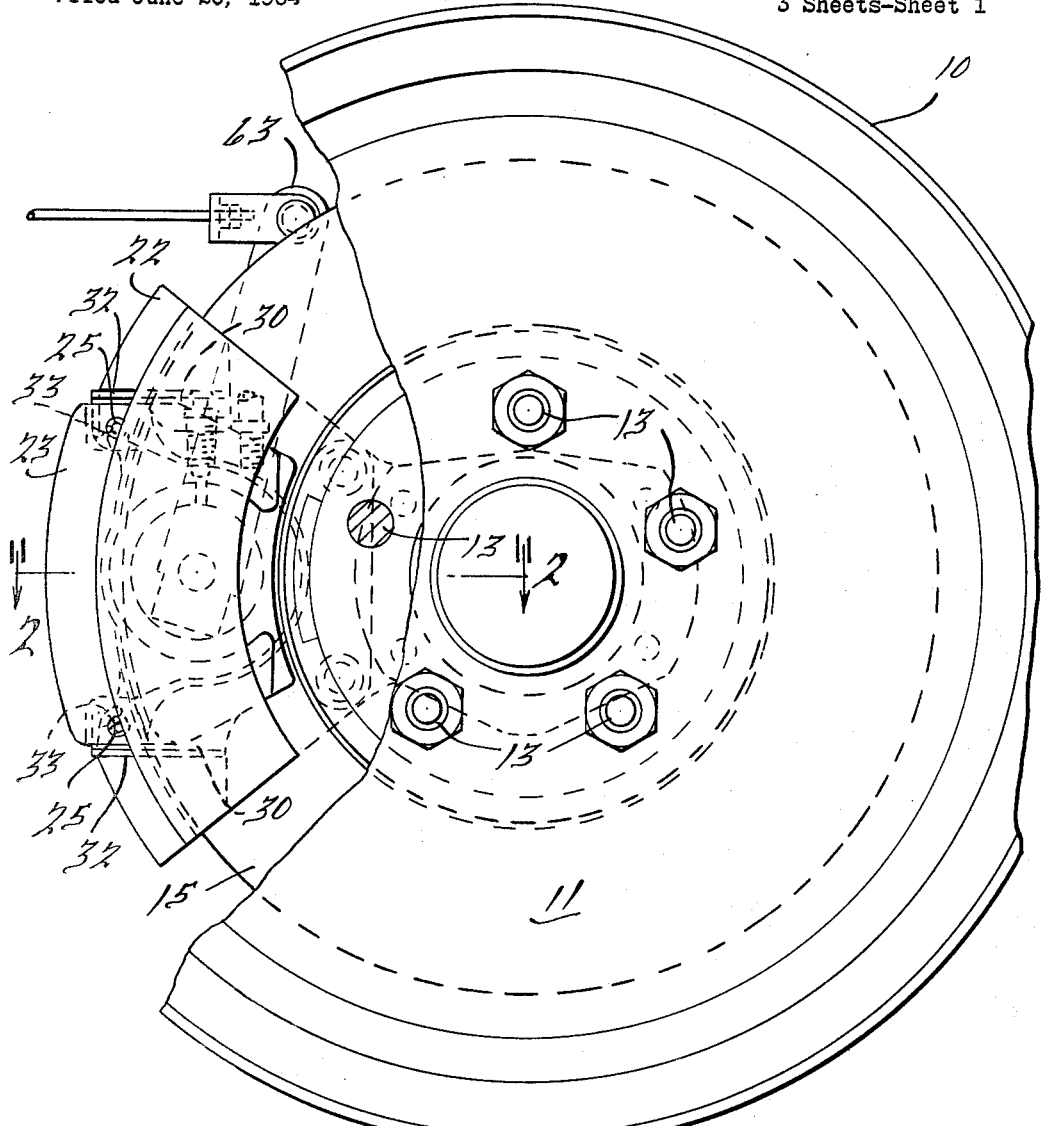
FIGURE 1 is an elevational view of a disk brake constructed in accordance with this invention, certain parts being broken away.

The disk brake of this invention is shown as being associated with a vehicle wheel having a rim 10 and a wheel body 11 secured to an axle flange 12 by means of studs or bolt and nut assemblies 13. Also secured to the axle flange 12 by means of studs or bolts 14, for rotation with the wheel 11, is a brake disk 15. The brake disk 15 is of the ventilated type having spaced braking walls 15a and 15b.

The reference character 20 indicates generally a torque member or spider which is secured to a fixed part (not shown) of the axle structure. Secured to the outer periphery of the torque member or spider 20 by means of bolts 21 or the like is a caliper-like housing or member 22.

This caliper-like housing or member 22 straddles a portion of the periphery of the brake disk 15 and slidably supports a floating head or yoke 23, which is substantially C-shaped. The caliper member 22 is provided at each end with a boss 24 adapted to receive and support a rod 25, the ends of which are engaged in ears 26 formed on the adjacent ends of the floating head or yoke 23. Each supporting rod or pin 25 is secured in place by being threaded as at 27 into one of the ears 26, as best shown in FIGURE 4. The caliper member or housing 22 is fixed, but the floating head or yoke 23 is movable relative thereto on the supporting pins 25 in the direction of the axis of the wheel, for a purpose which will become more apparent hereinafter.

Each brake shoe consists of a backing plate 30 carrying a friction lining 31 adapted to engage the braking surfaces 15a and 15b of the brake disk 15, see FIGURE 2. The brake shoes are supported on the pins 25 so as to be slidable thereon toward and away from the brake disk. To accomplish this, each brake shoe is provided at each lateral edge thereof with an extension 32 each provided with a slot 33 slidably engaging the supporting pin 25.

The C-shaped floating head or yoke member 23 constitutes a force transmitting member. This member 23 has one leg 34 thereof engaging one of the brake shoes. The other leg 35 is provided with a recess 36 forming a cylinder to slidably receive a hollow piston 37. The piston 37 is provided with an internal recess or bore 38 and a closed end 39 adapted to engage the other brake shoe. When fluid under pressure is admitted to the cylinder 36, behind the piston 37, the piston is moved to the left, as viewed in FIGURE 2, and the closed end 39 directly engages the adjacent brake shoe to move it against the brake disk. The reaction of this movement of the piston operates in the opposite direction to move the floating head or yoke 23 to the right so that the leg 34 thereof moves the other brake shoe into engagement with the brake disk. Thus, both brake shoes are actuated simultaneously by the use of a single piston.

The piston 37 may be provided with a packing 40, preferably in the form of an O-ring, between it and the cylinder 36 and with a dust excluding boot 41.

The present invention relates more particularly to means for manually actuating the brake shoes by mechanical means so that the brake may also be employed as a parking or emergency brake. For accomplishing this, there is provided a two-part extensible sleeve, indicated generally by the reference character 50. This extensible sleeve 50 comprises an inner sleeve portion 51 provided with exterior threads which mesh with interior threads on a second sleeve part 52 so that upon relative rotation between the sleeve parts 51 and 52, the length of the extensible sleeve member 50 will be extended. The inner sleeve member 51 is provided with an end portion 53 which engages the closed end 39 of the piston 37. The inner surface of the sleeve member 51 is provided with a series of longitudinally extending teeth 54 with which a pair of opposed dogs or pawls 55 engage. The dogs or pawls 55 are normally urged into engagement with the teeth 54 by means of a spring 56. The dogs or pawls 55 are carried in a recess in a rotatable shaft 60. The shaft 60 extends outwardly through a housing 61 and is provided with a knurled or serrated end 62 to which the brake actuating lever 63 is attached. The shaft 60 is provided with an annular collar 64, one face of which confronts the adjacent surface of the housing 61. The housing 61 is provided with a plurality, here shown as three, of shallow tapered or dish-shaped recesses 65. The confronting face of the flange 64 is provided with similar recesses 66. A ball 67 is located between each pair of recesses 65 and 66.

Thus, when the lever 63 is actuated to rotate the shaft 60, the balls will ride up the inclined or tapered surfaces 65 and 66 and force the shaft 60 to the left, as viewed in FIGURE 2. This will cause the flange 64 to move the extensible sleeve member 50 to the left and, inasmuch as the inner sleeve 51 is in thrust transmitting engagement with the piston, it will move the adjacent piston into brake applying position. As previously mentioned, the reaction to this movement of the piston will be transmitted through the floating head or yoke 23 to the other brake shoe to apply the same.

A bearing washer 70 is interposed between the flange 64 and an outwardly extending flange 71 on the sleeve 52 to transmit the thrust of the shaft 60 to the extensible sleeve member 50. The extensible sleeve member 50 is frictionally held against accidental displacement by means of an O-ring 72 carried by an adjacent portion of the floating head or yoke 23 and engaging the outer surface of the outer sleeve member 52. When the operating lever 63 is moved back to neutral position, the balls 67 will again return to the center of the recess 65 and 66 to relieve any axial thrust on the shaft 60.

Figure 5:
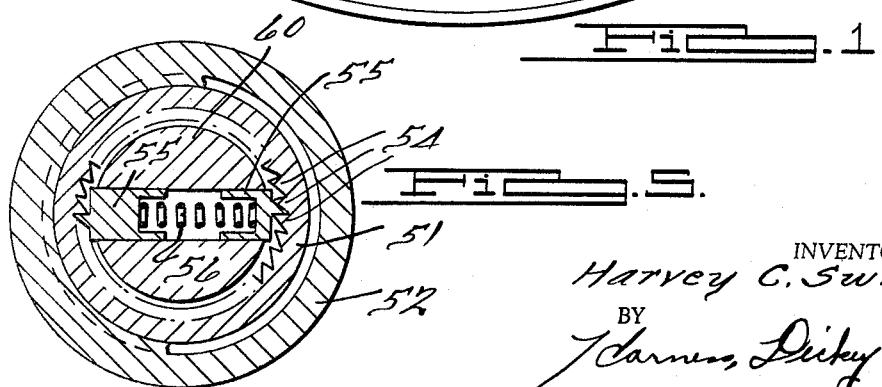
FIGURE 5 is an enlarged detailed sectional view taken on line 5—5 in FIGURE 2.

In order to compensate for wear on the brake shoe lining 31, the dogs or pawls 55 are operable to cause a relative rotation between the inner sleeve member 51 and the outer sleeve member 52. If, upon rotation of the shaft 60, the dogs or pawls 55 are moved far enough to pick up a new tooth 54 (see FIGURE 5), then, upon return of the lever 63 to its neutral position, the pawls 55 will rotate the inner sleeve 51 one tooth space so as to lengthen or extend the two-part sleeve member 50. This will tend to move the piston 37 to the left, as viewed in FIGURE 2, to take up any wear on the brake linings 31.

From the foregoing, it will be apparent that mechanical manually operated brake applying mechanism may be associated with a hydraulically operated brake to provide a parking or emergency brake, and each brake operating mechanism may be operated independently of the other. The greater portion of the mechanical brake actuating mechanism is assembled within and consolidated with the hollow piston of the hydraulic brake actuating mechanism. The only exteriorly arranged parts are the housing 61 which houses the cam or thrust inducing means, and the end of the shaft and the operating lever 63. Thus, the mechanical brake actuating mechanism may be effectively consolidated with the hydraulic brake actuating piston and assembled therewith as a complete unit.

While one commercially practical embodiment of the invention has been described and illustrated herein somewhat in detail, it will be understood that various changes may be made as may come within the purview of the accompanying claims.

What is claimed is:

1. A wheel brake of the class described comprising, a brake disk rotatable with the wheel, a stationary torque member, a pair of brake shoes supported by said torque member for movement toward and away from said brake disk, a force transmitting member supported on said torque member and engageable with one of said brake shoes to actuate the same, a substantially hollow brake actuating piston carried by said force transmitting member to actuate the other of said brake shoes and through said force transmitting member to actuate said first mentioned brake shoe, a two part adjustable extensible sleeve member located within said piston and having a thrust transmitting engagement therewith, cam means for moving said sleeve member to actuate said piston, said cam means including a rotatable shaft extending into said sleeve member, and means for adjusting the length of said sleeve member to compensate for wear on the brake shoe linings comprising, a pawl and ratchet connection between said shaft and one of said sleeve members to rotate the latter to adjust said sleeve member to move said piston toward said brake disk.

2. A wheel brake of the class described comprising, a brake disk rotatable with the wheel, a stationary torque member, a pair of brake shoes supported by said torque member for movement toward and away from said brake disk, a force transmitting member supported on said torque member and engageable with one of said brake shoes to actuate the same, a substantially hollow brake actuating piston carried by said force transmitting member to actuate the other of said brake shoes and through said force transmitting member to actuate said first mentioned brake shoe, a two part adjustable extensible sleeve member located within said piston and having a thrust transmitting engagement therewith, cam means for moving said sleeve member to actuate said piston, said cam means including a rotatable shaft extending into said sleeve member and pawl and ratchet means carried by said shaft operable upon actuation of said cam means for adjusting the length of said sleeve member to compensate for wear on the brake shoe linings.

3. A disk brake for wheels comprising, a brake disk rotatable with the wheel, a stationary torque member, a pair of brake shoes supported by said torque member for movement toward and from said brake disk, a piston for actuating one of said brake shoes, said piston being provided with a space therein, an adjustable thrust transmitting member comprising a pair of threadedly interconnected sleeve members located in said piston space for moving said piston in one direction, manually operated cam means for moving said thrust member comprising a rotatable shaft extending into said thrust member, and a pawl and ratchet connection between said shaft and one of said threadedly interconnected members to rotate the latter to adjust said thrust member to move said piston to compensate for wear on its brake shoe lining.

4. A device as described in claim 3 in which said cam means comprises a pair of relatively rotatable members having opposed cam grooves therein, and a ball member in said grooves adapted to impart a thrust to one of said members upon relative rotation of said rotatable members.

References Cited by the Examiner

UNITED STATES PATENTS

| | | | |
|---|---|---|---|
| 2,820,530 | 1/1958 | Chouings et al. | 188—73 |
| 2,949,173 | 8/1960 | Peras | 188—73 X |
| 2,966,964 | 1/1961 | Brueder | 188—73 |
| 3,155,195 | 11/1964 | Brawerman | 188—73 |

FOREIGN PATENTS

| | | |
|---|---|---|
| 1,279,344 | 11/1961 | France. |
| 799,577 | 8/1958 | Great Britain. |

MILTON BUCHLER, *Primary Examiner.*

G. E. A. HALVOSA, *Assistant Examiner.*